United States Patent [19]

Lucas et al.

[11] Patent Number: 4,576,194

[45] Date of Patent: Mar. 18, 1986

[54] PNEUMATIC CONTROL SYSTEM, CONTROL MEANS THEREFOR AND METHOD OF MAKING THE SAME

[75] Inventors: William L. Lucas, Henrico County; Clarence M. Asbill, III, Richmond; Gerald L. Frank; David M. Miller, both of Henrico County, all of Va.

[73] Assignee: Robertshaw Controls Company, Richmond, Va.

[21] Appl. No.: 602,018

[22] Filed: Apr. 19, 1984

[51] Int. Cl.$^4$ ............................................. G05D 16/00
[52] U.S. Cl. ........................................ 137/84; 137/85
[58] Field of Search .................. 137/84, 85, 487.5, 86

[56] References Cited

U.S. PATENT DOCUMENTS

| | | | |
|---|---|---|---|
| 2,993,497 | 7/1961 | Coles | 137/85 |
| 3,113,582 | 12/1963 | Hudson | 137/85 X |
| 3,266,380 | 8/1966 | Eige | 137/84 X |
| 3,369,561 | 2/1968 | Zimmerman | 137/486 |
| 3,540,461 | 11/1970 | Smith | 137/85 |
| 3,598,138 | 3/1970 | Hadley | 137/85 |
| 4,325,399 | 4/1982 | Frick | 137/85 |

Primary Examiner—Alan Cohan
Attorney, Agent, or Firm—Candor, Candor & Tassone

[57] ABSTRACT

A pneumatic control system, control unit and method of making the same are provided, the system comprising a pneumatic source, a pneumatically operated device that produces an output, and a control unit for interconnecting the source to the device. The control unit has an input interconnected to the source and an output interconnected to the device, the control unit having a set point for selecting a desired output of the device. The control unit has a valve unit for controlling the interconnection between the input and the output thereof so as to regulate the pressure value in the output of the control unit. The control unit has a regulating unit for operating the valve unit to tend to produce an output of the device that corresponds to the selected output of the set point. The regulating unit senses the pressure value in the output of the control unit and operates the valve unit so as to produce a pressure value in the output of the control unit that is substantially equal to the pressure value that will cause the device to produce the selected output.

6 Claims, 7 Drawing Figures

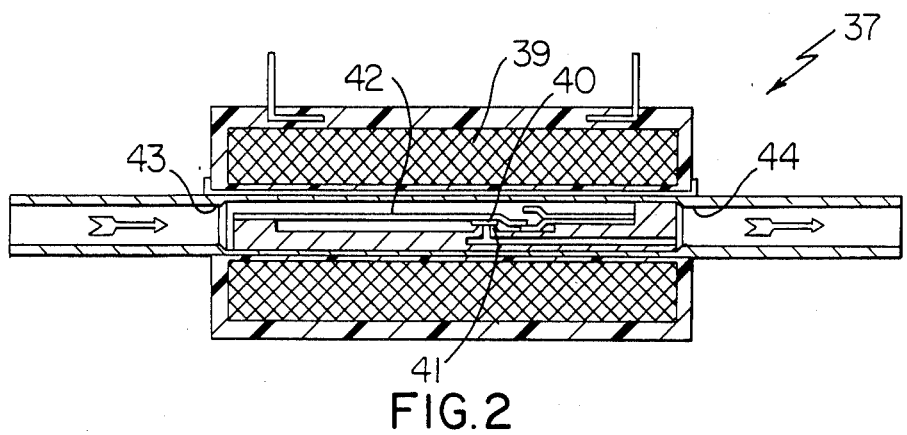
FIG.2
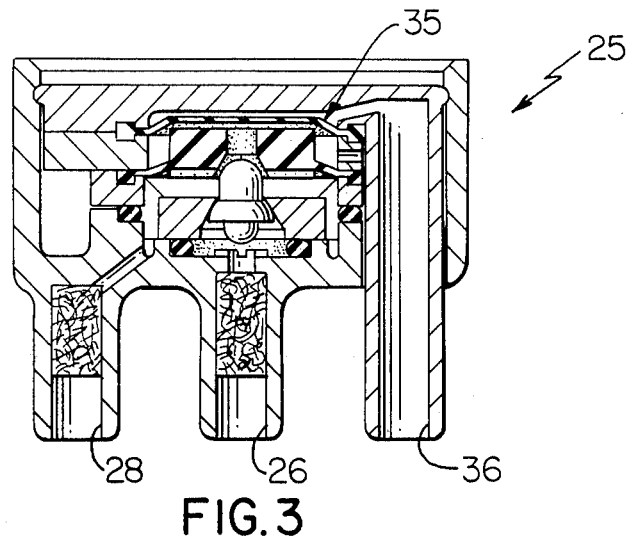
FIG.3
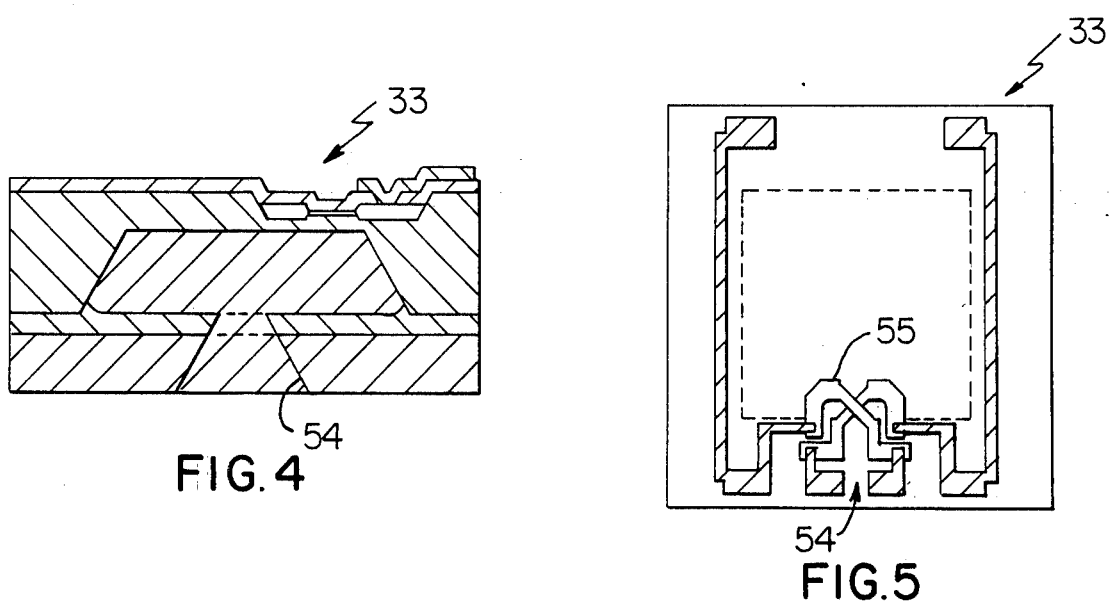
FIG.4
FIG.5

PNEUMATIC CONTROL SYSTEM, CONTROL MEANS THEREFOR AND METHOD OF MAKING THE SAME

BACKGROUND OF THE INVENTION

1. Field of the Invention

This invention relates to an improved pneumatic control system and control means therefor as well as to a method of making such a control system.

2. Prior Art Statement

It is known to provide a pneumatic control system comprising a pneumatic source, a pneumatically operated device that produces an output, and a control means for interconnecting the source to the device. The control means has an input means interconnected to the source and an output means interconnected to the device, the control means having set point means for selecting a desired output of the device. The control means has valve means for controlling the interconnection between the input means and the output means so as to regulate the pressure value in the output means. The control means has regulating means for operating the valve means to tend to produce an output of the device that corresponds to the selected output of the set point means.

It is applicants' belief that such prior known control system has the regulating means sensing the output effect of the pneumatically operated device and operates the valve means so as to produce a pressure value in the output means that is substantially equal to a pressure value that will cause the device to produce the selected output. For example, see Smith U.S. Pat. No. 3,540,461.

SUMMARY OF THE INVENTION

It is a feature of this invention to provide an improved pneumatic control system wherein the regulating means thereof senses the pressure value in the output means to operate the valve means thereof rather than sense the output effect of the pneumatically operated device controlled by such system as in prior known systems.

In particular, it was found according to the teachings of this invention that the output pressure value of the control system can be converted into an electrical signal that can be compared with a set point setting so as to control electrically operated valve means that effectively interconnect the pneumatic source to the output means that leads to the pneumatically operated device so as to produce a pressure value in that output means that is substantially equal to a pressure value that will cause the device to produce the selected output.

For example, one embodiment of this invention provides a pneumatic control system comprising a pneumatic source, a pneumatically operated device that produces an output, and a control means for interconnecting the source to the device, the control means having an input means interconnected to the source and an output means interconnected to the device. The control means has set point means for selecting a desired output of the device, the control means having valve means for controlling the interconnection between the input means and the output means so as to regulate the pressure value in the output means. The control means has regulating means for operating the valve means to tend to produce an output of the device that corresponds to the selected output of the set point means, the regulating means having means that senses the pressure value in the output means and operates the valve means so as to produce a pressure value in the output means that is substantially equal to a pressure value that will cause the device to produce the selected output.

The control means comprises a relay means having the input means and the output means. The relay means has a pilot input and a valve unit for interconnecting the input means to the output means in relation to the pressure value in the prior input. The valve means is interconnected to the source and to the pilot input whereby the regulating means operates the valve means to create the pressure value in the pilot input in relation to the sensed pressure value in the output means. The control means comprises an accumulator means interconnected to the pilot input intermediate the valve means and the relay means and a restrictor means disposed intermediate the valve means and the accumulator means. The regulating means also has means that is remote from the relay means and senses the pressure value in the pilot input at a point intermediate the accumulator means and the relay means.

Accordingly, it is an object of this invention to provide an improved control system having one or more of the novel features of this invention as set forth above or hereinafter shown or described.

Another object of this invention is to provide an improved control means for such a control system or the like, the control means of this invention having one or more of the novel features of this invention as set forth above or hereinafter shown or described.

Another object of this invention is to provide an improved method of making such a pneumatic control system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 2 is a fragmentary cross-sectional view illustrating one of the electrically operated valve means of the control system of FIG. 1.

FIG. 3 is a cross-sectional view illustrating the pneumatic relay construction utilized in the system of FIG. 1.

FIG. 4 is a schematic cross-sectional view illustrating the pressure sensor utilized in the system of FIG. 1.

FIG. 5 is another schematic cross-sectional view of the pressure sensor of FIG. 4.

DESCRIPTION OF THE PREFERRED EMBODIMENT

Figure 1:
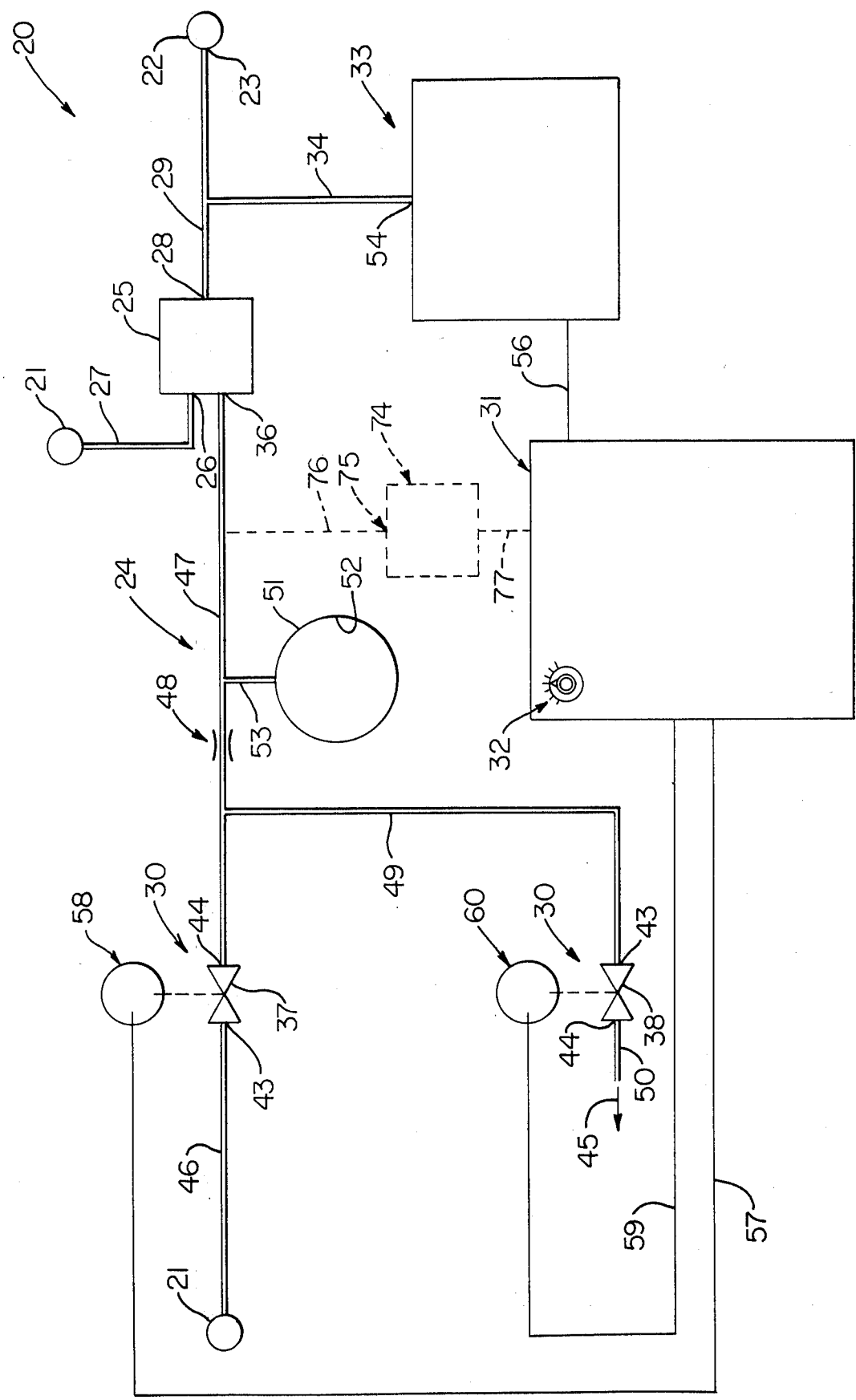
FIG. 1 is a schematic view illustrating the improved control system of this invention.

While the various features of this invention are hereinafter illustrated and described as being particularly adapted to utilize electrical means to control the pneumatic signal being directed to a pneumatically operated device, it is to be understood that the various features of this invention can be utilized singly or in any combination with non-electrical means to provide the pneumatic signal for the pneumatically operated device.

Therefore, this invention is not to be limited to only the embodiment illustrated in the drawings, because the drawings are merely utilized to illustrate one of the wide variety of uses of this invention.

Referring now to FIG. 1, the improved pneumatic control system of this invention is generally indicated by the reference numeral 20 and comprises a pneumatic source 21 and a pneumatically operated device 22 that is adapted to produce an output in relation to the pressure value of the pressure fluid directed to its inlet 23 in a manner well known in the art, the control system 20 of this invention having a control means of this invention that is generally indicated by the reference numeral 24 and that is being utilized for interconnecting the pneumatic source 21 to the pneumatically operated device 22 in a manner hereinafter set forth.

The pneumatic source 21 is illustrated in two places in FIG. 1 and can provide a pressure fluid with any suitable substantially constant pressure value, such as 20 psig to be utilized in a manner hereinafter set forth.

The control means 24 of this invention comprises a relay means 25 that has an input means 26 interconnected by a conduit means 27 to the source 21 and an output means 28 interconnected by a conduit means 29 to the inlet 23 of the pneumatically operated device 22, the relay means 25 being of any conventional type, such as the type illustrated in FIG. 3 which is fully disclosed in the aforementioned Smith U.S. Pat. No. 3,540,461, whereby this patent is being incorporated into this disclosure by this reference thereto.

The control means 24 also comprises valve means that is generally indicated by the reference numeral 30 in two places in FIG. 1 for effectively controlling the interconnection between the input means 26 and the output means 28 so as to regulate the pressure value in the output means 28 and, thus, in the conduit means 29 in a manner hereinafter set forth.

The control means 24 has regulating means that is generally indicated by the reference numeral 31 for operating the valve means 30 to tend to produce an output of the device 22 that corresponds to the selected output of a set point means of the regulating means 31, the set point means being generally indicated by the reference numeral 32 in FIG. 1 and being adapted to be adjusted to any desired output effect of the device 22 within the range that is adapted to be provided by the system 20 in a manner hereinafter set forth.

The regulating means 31 has pressure sensing means 33 that is adapted to sense the pressure value in the output means 28 by having a conduit 34 thereof interconnected to the conduit means 29 intermediate the relay means 25 and the device 22 whereby the regulating means 31 is adapted to operate the valve means 30 in a manner hereinafter set forth so as to produce a pressure value in the output means 28 that is substantially equal to a pressure value therein that will cause the device 22 to produce an output that has been selected by the set point means 32 as will be apparent hereinafter.

The relay means 25 has a valve unit 35, FIG. 3, therein that provides the interconnection between the input means 26 and output means 28 thereof in relation to the pressure value of a pressure fluid being directed to a pilot input means 36 thereof in a manner well known in the art and as set forth in the aforementioned Smith U.S. Pat. No. 3,540,461.

The valve means 30 of the control means 24 of this invention comprise two valves 37 and 38 which are each adapted to be electrically operated and can be of the type set forth in the Fournier U.S. Pat. No. 4,114,852 whereby this patent is also being incorporated into this disclosure by this reference thereto.

The valve 37 is illustrated in FIG. 2 and has a coil means 39 which when energized will cause a valve member 40 to open a valve seat 41 in opposition to the spring force of a leaf spring or "reed" 42 and thereby interconnect an inlet 43 of the valve 37 with an outlet 44 thereof, the valve member 40 being carried by the leaf spring 42 and normally closing against the valve seat 41 when the coil 39 is de-energized because the natural bias of the leaf spring or "reed" 42 places the valve member 40 against the valve seat 41.

In this manner, the valve 37 is a normally closed valve whereas the valve 38 is a normally open valve, i.e., when the electrical current to the coil 39 thereof is terminated, the "reed" or leaf spring 42 thereof moves the valve member 40 to an open position relative to the valve seat 41 so that the inlet 43 is interconnected to the outlet 44 thereof.

Accordingly, the valve 38 is adapted to interconnect the pneumatic circuit of the system 20 to vent or atmosphere, that is indicated by the reference numeral 45 in FIG. 1, whenever the electrical current to the system 20 is terminated or interrupted.

The inlet 43 of the valve 37 is interconnected by a conduit means 46 to the source 21 while the outlet 44 thereof is interconnected by a conduit means 47 to the pilot input means 36 of the relay 25, the conduit means 47 having a restrictor means 48 disposed therein for a purpose hereinafter described.

The inlet 43 of the valve 38 is interconnected by a branch conduit means 49 to the conduit means 47 intermediate the outlet 44 of the valve 37 and the restrictor means 48, the outlet 44 of the valve 38 being interconnected to the vent 45 by a conduit means 50.

An accumulator means 51 has its chamber 52 interconnected by a conduit means 53 to the conduit means 47 at a point intermediate the restrictor means 48 and the pilot input means 36, the accumulator means 51 being utilized to smooth out or dampen rate changes in the pressure value of the pressure fluid in the conduit means 47 between the restrictor means 48 and the input means 36 as will be apparent hereinafter.

The pressure sensor 33 is of a type well known in the art wherein the same converts the force of the pressure fluid being directed to an inlet 54 thereof, FIGS. 1, 4 and 5, into an electrical output voltage that is proportional to the pressure value of such pressure fluid. For example, the pressure sensor 33 can comprise a silicon transverse voltage strain gauge means known as an "MPX Series X-ducer" manufactured by the Motorola Company of Chicago, Ill., and in the working example of this invention being adapted to produce the output voltage in proportion to a range of pressure values from approximately 0 psig to approximately 30 psig being directed to the inlet 54 thereof. However, in the working example of this invention, the sensor 33 will only receive a pressure value from the output means 28 between approximately 0 psig to approximately 20 psig as will be apparent hereinafter.

Figure 6:
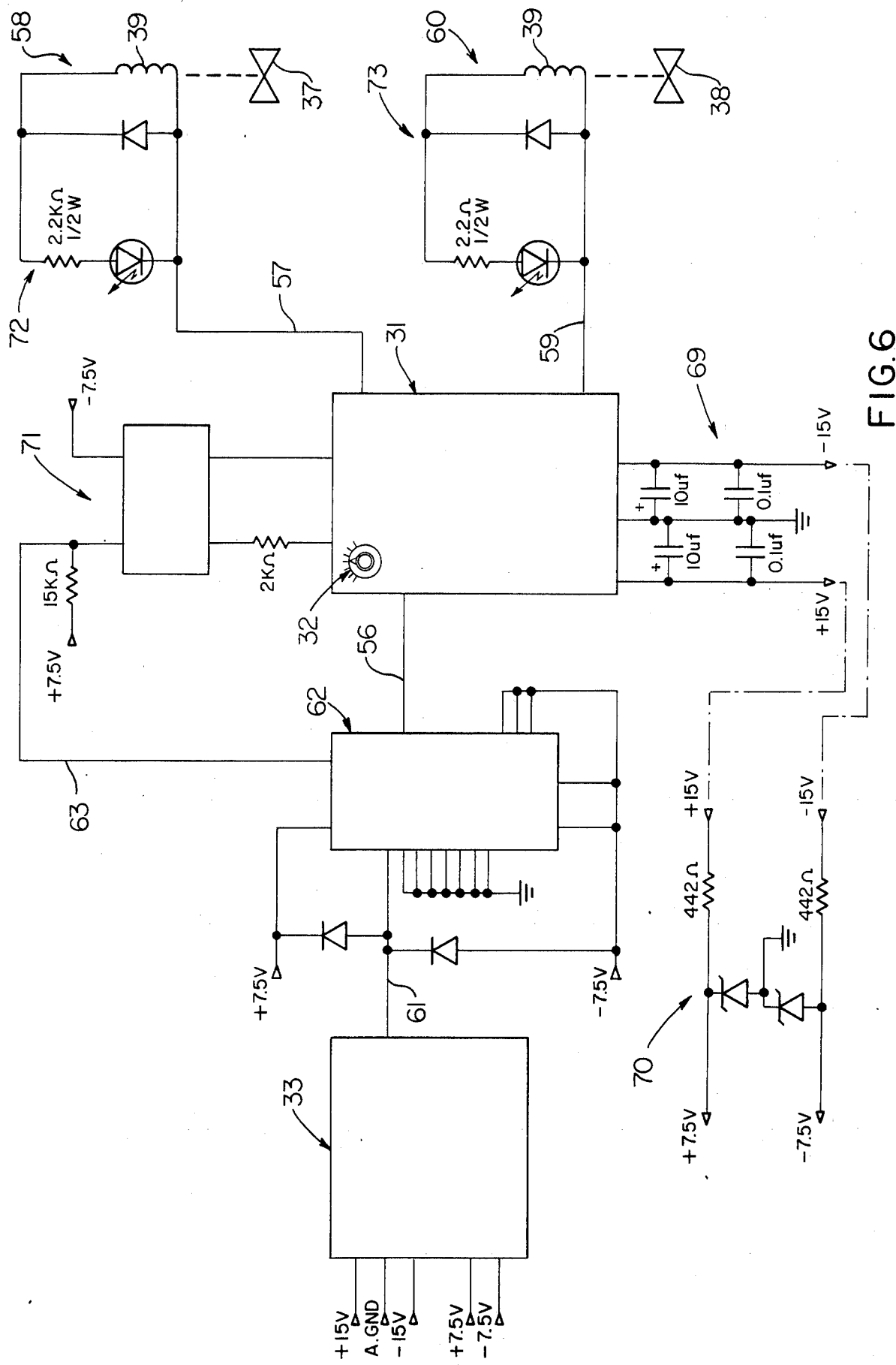
FIG. 6 is a schematic view illustrating the electrical system that can be utilized in the system of FIG. 1 to provide the electrical signal for the valve means thereof.
Figure 7:
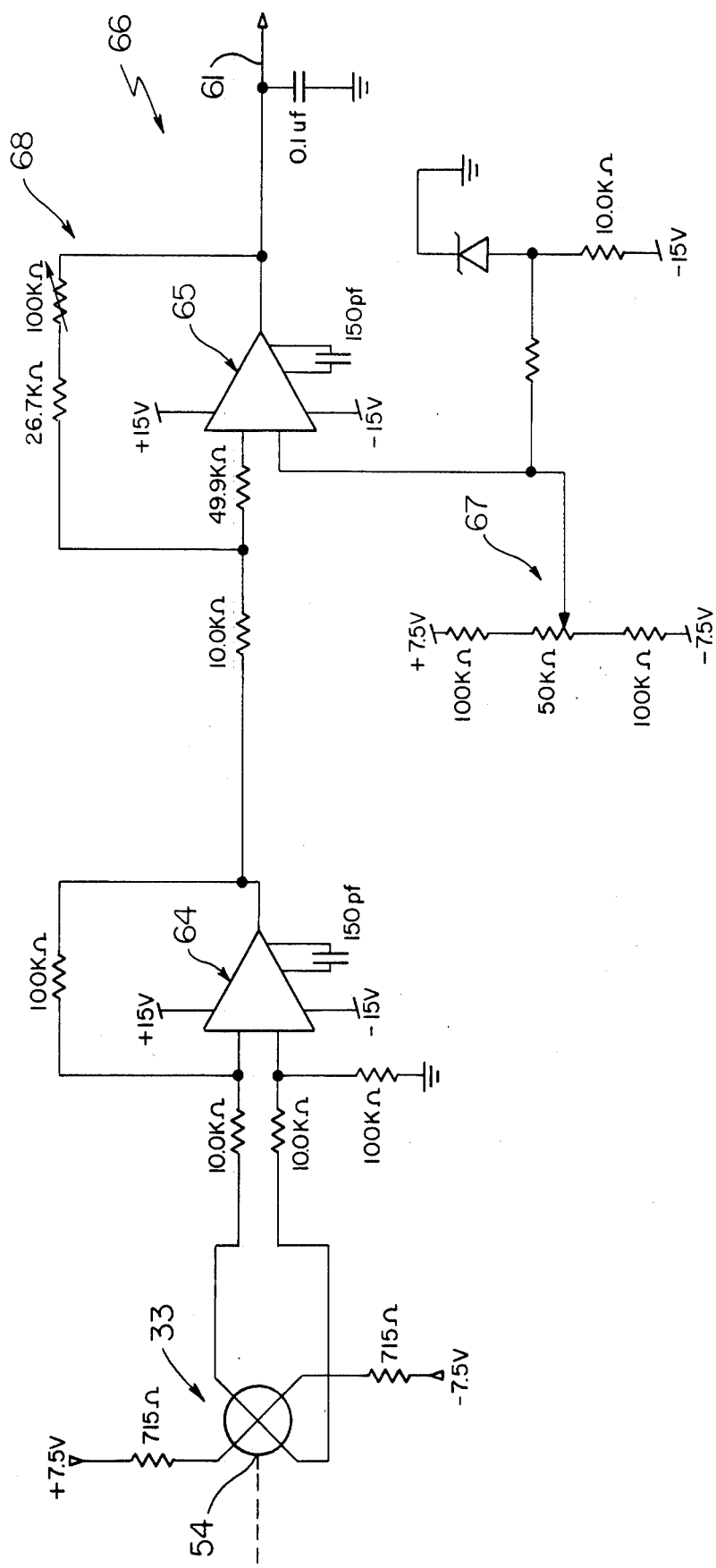
FIG. 7 is a schematic view illustrating the electrical system for directing an electrical signal from the pressure sensor of FIG. 1 to the electrical system of FIG. 6.

The transverse voltage strain gauge of the sensor 33 is indicated by the reference numeral 55 in FIGS. 5 and 7, FIG. 7 also illustrating the additional electrical circuit means for feeding the electrical signal to the regulating means 31 through an electrical connection that is indicated by the reference numeral 56 in FIGS. 1 and 6 so that the regulating means 31 can compare a digital signal thereof with a reference signal selected by the set point means 32 to determine whether or not the output pressure value in the output means 28 is equal in value to the output pressure value that should be therein if the same had the output means 22 producing the output selected by the set point means 32. If not, the regulator means 31 will direct either an electrical current through an electrical line 57 to an operator means 58 of the valve 37 to cause the same to direct more pressure fluid into the conduit means 47 and, thus, into the pilot input means 36 so that the relay 25 will increase the pressure value in the output means 28 or will direct an electrical signal through an electrical connection 59 to an operator means 60 of the valve 38 to cause the valve 38 to vent pressure fluid from the conduit means 47 and thereby reduce the pressure value of the pressure signal being directed to the pilot input means 36 so that the relay 25 will reduce the pressure value of the pressure fluid in the output means 28.

However, it is to be understood that such regulation of the valve means 30 could be under the control of pneumatic or other mechanical means whereby this invention is not to be limited to an electrical operation thereof.

Therefore, it can be seen that the control system 20 of this invention can be made of relatively few parts to operate in a unique manner to have the pneumatically operated device 22 produce an output that corresponds to the output selected by the set point means 32.

In particular, the operator sets the set point means 32 at a setting that the operator desires the pneumatically operated device 22 to produce.

The regulating means 31, which can comprise a conventional computer, has been preprogrammed so that the same will take sample readings, in a periodic manner, from the pressure sensing means 33 and compare the same against a reference voltage that has been selected by the set point means 32 so that if the pressure value of the pressure fluid in the output means 28 is not of the value that corresponds to the value selected by the setting of the set point means 32, the regulating means or computer 31 will control the valve means 30 to cause the pressure value of the pressure signal in the conduit means 47 being fed to the pilot input means 36 of the relay means 25 to cause the valve unit 35 thereof to change the interconnection between the source 21 and the output means 28 so that the output means 28 will have the correct pressure value therein to cause the pneumatically operated device 22 to produce the particular output that the set point means 32 has selected.

For example, should the pressure value in the output means 28 be below the pressure value that should be therein for the particular setting of the set point means 32, the voltage produced by the sensing means 33 and being sampled by the computer 31, causes the computer 31 to direct an electrical signal to the operator means 58 of the valve 37 in such a manner that the coil 39 causes the valve member 40 to move relative to the valve seat 41 in such a manner that an increased flow of pressure fluid is permitted to pass from the source 21 through the valve 37 into the conduit means 47 and pass through the restrictor 48 to the pilot input means 36 of the relay 25, the accumulator means 51 smoothing out or dampening such rate change in the pressure value in the conduit means 47 in a manner well known in the art. The relay means 25 now receiving the pressure signal with an increased pressure value in the pilot input means 36 thereof, causes the valve unit 35 thereof to increase the pressure value in the output means 28 by interconnecting the source 21 to the output means 28 at an increased rate so that the pressure value in the output means 28 is increased to tend to cause the pneumatically operated device 22 to produce the output selected by the set point means 32. Thus, the regulator means 31, through its periodic sampling of the output voltage of the sensor 33, will bring the pressure value in the output means 28 to a pressure value which will cause the pneumatically operated device 22 to produce the output that has been selected by the set point means 32.

Conversely, should the pressure value in the output means 28 be greater than the amount necessary to cause the device 22 to produce the output selected by the set point means 32, the regulator means 31 causes the valve 38 to open to vent a certain amount of the pressure fluid in the conduit means 47 to the atmosphere or vent 45 and, thus, reduce the pressure value of the pressure fluid at the pilot input means 36 of the relay means 25, the accumulator 51 smoothing out or dampening such rate reduction in the pressure value of the fluid in the conduit 47 in a manner well known in the art. With the pressure signal now having a reduced pressure value at the pilot input means 36, the relay means 25 reduces the interconnection between the source 21 and the output means 28 in a manner well known in the art so that the pressure value in the output means 28 decreases until eventually it reaches the pressure value that corresponds to the pressure value that causes the output of the device 22 to correspond to the output setting of the set point means 32.

As previously stated, while the regulating means 31 and its associated means are electrically operated, it is to be understood that the regulating means 31 could be pneumatically operated or even mechanically operated as one of the important features of this invention is that the regulating means 31 has means 33 that senses the pressure value in the output means 28 and operates the valve means 30 so as to produce a pressure value in the output means 28 that is substantially equal to a pressure value that will cause the device 22 to produce the output that was selected by the set point means 32.

However, the particular electrical means for the regulating means 31 that has successfully produced the desired result is illustrated in FIGS. 6 and 7 and will now be described.

As illustrated in FIG. 6, the sensing means 33 sends its output signal through an electrical line 61 to an electronic switching means 62 which is adapted to receive a signal through a line 63 from the computer 31 to direct the voltage signal from the line 61 to the line 56 that leads to the computer 31 when the computer 31 is to sample the particular pressure value in the output means 28 as previously described.

As illustrated in FIG. 7, the pressure sensing means is generally indicated by the reference numeral 33 and has the inlet 54 previously described and the output voltage from the pressure sensing means 33 is directed through a first operational amplifier 64 and then a second operational amplifier 65 to be connected to the lead 61 which leads to the switching device 62 of FIG. 6. The electrical circuit between the pressure sensing means 33 and the lead 61 is generally indicated by the reference numeral 66 in FIG. 7 and not only includes the operational amplifiers 64 and 65, but also an offset adjustment means that is generally indicated by the reference numeral 67 and a span adjustment means which is generally indicated by the reference numeral 68, the offset adjustment 67 and span adjustment 68 being utilized to calibrate the circuit 66 for producing an output voltage in the lead 61 through a desired range for the particular range of the pressure value of the pressure fluid that will be directed to the inlet 54 of the pressure sensor 33.

For example, the pressure value range of the pressure fluid being directed to the inlet 54 is 0 psig to 20 psig, in the particular example of the electrical system illustrated in FIGS. 6 and 7 and it is desired that the output voltage range at the lead 61 in FIG. 7 be between 0 volts and approximately 4.095 volts. Thus, the circuit 66 is calibrated by first directing 0 psig to the inlet 54 of the sensing means 33 at which time the offset adjustment 67 is adjusted until the voltage at the lead 61 is at 0 volts. Thereafter, a test pressure of 20 psig is directed to the inlet 54 of the sensor 33 and the span adjustment means 68 is adjusted until the output voltage 61 is approximately 4.095 volts. After the circuit 66 has been calibrated in such manner, further calibration thereof is not necessary during the operation of the control system 20 of this invention.

It is believed that the electrical circuit 66 is clearly understandable without further description thereof as FIG. 7 has the appropriate resistor and capacitor sizes indicated thereon as well as the particular voltages being applied thereto which is directed from the appropriate electrical circuits of the computer 31 of FIG. 6.

In particular, it can readily be seen in FIG. 6 that the computer 31 will provide approximately ±15 volts for the system 20 by the circuit that is generally indicated by the reference numeral 69 and converts that voltage to approximately ±7.5 volts by the circuit that is generally indicated by the reference numeral 70 so that the ±15 volts and ±7.5 volts can be provided for the various parts of circuit 66 previously described and indicated in FIG. 7 as well as for the switching means 62 as illustrated in FIG. 6 and for the circuit means 71 that operates the switch 62 and for the circuits that are generally indicated by the reference numerals 72 and 73 for operating the valves 37 and 38 in the manner previously described.

The electrical circuits 72 and 73 for the valves 37 and 38 are respectfully supplied from the computer 31 by the electrical lines 57 and 59 previously described in connection with FIG. 1, the electrical circuits 72 and 73, as well as the switching means 62 and electrical circuits 69, 70 and 71, have appropriate resistor and capacitor sizes indicated thereon in FIG. 6 as well as the particular voltages applied thereto whereby it is believed unnecessary to further describe the electrical circuits of FIGS. 6 and 7 as a person skilled in the art can readily reproduce the same.

However, in the particular working example of this invention illustrated in FIGS. 1, 6 and 7, the valves 37 and 38 comprise valves sold by the Reedex Corporation, 304 Pleasant Street, Watertown, Mass. 02172 under its respective part numbers V2ANC3524BNN and V2ANO3524BNN. The particular pressure sensor 33 is sold by the Motorola Company of Chicago, Ill. under its part number MPX200GP and the particular relay 25 is sold by the Robertshaw Controls Company of Richmond, Va. under its part number R432-11.

With the aforementioned electrical circuits and particular parts for the working embodiment of the system 20 of this invention, the orifice of the restriction means 48 has a diameter of approximately 0.007 of an inch and the accumulator means 51 has the chamber 52 thereof of approximately 20 cubic inches.

The operation of the control system 20 when utilizing the electrical circuits of FIGS. 6 and 7 and the particular parts previously described is as follows.

The computer 31 is programmed in a manner conventional in the art to periodically compare the voltage of the electrical signal being produced by the pressure sensor 33 sensing the pressure value of the pressure fluid in the output means 28 of the system 20 by causing the electrical circuit 71 to operate the switch means 62 and thereby direct the electrical signal from the line 61 into the computer 31 which converts the same from an analog signal to a digital signal in a manner well known in the art and then compares such digital signal to a reference digital signal that has been selected by the set point means 32. In this manner, should the pressure value in the output means 28 be below the pressure value which would cause the device 22 to produce the output that has been selected by the set point means 32, the computer 31 energizes the electrical circuit 72 to cause the valve means 37 to increase the pressure value of the pressure fluid delivered to the pilot input means 36 and, thus, increase the pressure value of the pressure fluid in the output means 28 in the manner previously described so as to cause the device 20 to increase its output effect. Conversely, should the computer 31 determine that the pressure value in the output means 28 is too great, the same energizes the electrical circuit 73 to cause the valve 38 to vent some of the pressure fluid that is directed to the pilot input 36 and thereby cause the relay 25 to reduce the pressure value in the output means 28 in the manner previously described so as to cause the device 22 to decrease its output effect.

Of course, it is to be understood the valve means 37 and 38 can be operated in increments of time, such as in miliseconds, as desired, and the restrictor means 48 and accumulator means 51 will smooth out or dampen the rate of change in the pressure value of the pressure fluid in the conduit 47 between the orifice 48 and the pilot input 36 for the reasons previously set forth.

It is believed that an additional pressure sensor could be utilized in the system 20 to sense the pressure value of the pressure fluid in the pilot input means 36 with such signal being directed to the computer 31 so as to substantially eliminate any delay errors in the booster relay 25.

For example, reference is again made to FIG. 1 wherein such second pressure sensing means is generally indicated by the reference numeral 74 and has its inlet 75 interconnected by a branch conduit 76 to the conduit 47 intermediate the accumulator means 51 and the pilot input means 36 so as to sense the pressure value in the pilot input means 36, the sensor 74 being electrically interconnected to the computer 31 by the electrical line 77 in substantially the same manner that the pressure sensor means 33 is interconnected by the electrical line 56 to the computer 31.

In any event, it can be seen that this invention provides a pneumatic control system 20 comprising a pneumatic source 21, a pneumatically operated device 22 that produces an output, and a control means 24 for interconnecting the source 21 to the device 22. The control means 24 has an input means 26 interconnected to the source 21 and an output means 28 interconnected to the device 22. The control means 24 has a set point means 32 for selecting a desired output of the device 22. The control means 24 has valve means 30 for controlling the interconnection between the input means 26 and output means 28 so as to regulate the pressure value in the output means 28. The control means 24 has regulating means 31 for operating the valve means 30 to tend to produce an output of the device 22 that corresponds to the selected output of the set point means 32. The regulating means 31 has means 33 that senses the pressure value in the output means 28 and operates the valve means 30 so as to produce a pressure value in the output means 28 that is substantially equal to a pressure value that will cause the device 22 to produce the selected output.

It is believed, that by sensing the pressure value of the pressure fluid in the output means of the control means, the control system of this invention can be adjusted more rapidly by the regulating means to maintain the desired output of the controlled device than when the output effect of the controlled device is sensed for operating the regulating means as in prior known control systems.

Therefore, it can be seen that this invention not only provides an improved pneumatic control system and method of making the same, but also this invention provides an improved control means or transducer means for such a pneumatic system or the like.

While the forms and methods of this invention now preferred have been illustrated and described as required by the Patent Statute, it is to be understood that other forms and method steps can be utilized and still fall within the scope of the appended claims.

What is claimed is:

1. In a pneumatic control system comprising a pneumatic source, a pneumatically operated device that produces an output, and a control means for interconnecting said source to said device, said control means having an input means interconnected to said source and an output means interconnected to said device, said control means having set point means for selecting a desired output of said device, said control means having valve means for controlling the interconnection between said input means and said output means so as to regulate the pressure value in said output means, said control means having regulating means for operating said valve means to tend to produce an output of said device that corresponds to said selected output of said set point means, said regulating means having means that senses said pressure value in said output means and operates said valve means so as to produce a pressure value in said output means that is substantially equal to a pressure value that will cause said device to produce said selected output, said control means comprising a relay means having said input means and said output means, said relay means having a pilot input and a valve unit for interconnecting said input means to said output means in relation to the pressure value in said pilot input, said valve means being interconnected to said source and to said pilot input whereby said regulating means operates said valve means to create said pressure value in said pilot input in relation to the sensed pressure value in said output means, said control means comprising an accumulator means interconnected to said pilot input intermediate said valve means and said relay means, and a restrictor means disposed intermediate said valve means and said accumulator means, the improvement wherein said regulating means also has means that is remote from said relay means and senses the pressure value in said pilot input at a point intermediate said accumulator means and said relay means.

2. A pneumatic control system as set forth in claim 1 wherein said valve means comprises a pair of valves one of which has an inlet means interconnected to said source and an outlet means interconnected to said pilot input and the other of which has an inlet means interconnected to said outlet means of said one valve and an outlet means interconnected to vent.

3. A pneumatic control system as set forth in claim 2 wherein each of said valves comprises an electrically operated valve.

4. In a control means for a pneumatic control system that has a pneumatic source and a pneumatically operated device that produces an output, said control means being adapted to interconnect said source to said device and having an input means adapted to be interconnected to said source and an output means adapted to be interconnected to said device, said control means having set point means for selecting a desired output of said device, said control means having valve means for controlling the interconnection between said input means and said output means so as to regulate the pressure value in said output means, said control means having regulating means for operating said valve means to tend to produce an output of said device that corresponds to said selected output of said set point means, said regulating means having means that is adapted to sense said pressure value in said output means and operate said valve means so as to produce a pressure value in said output means that is substantially equal to a pressure value that will cause said device to produce said selected output, said control means comprising a relay means having said input means and said output means, said relay means having a pilot input and a valve unit for interconnecting said input means to said output means in relation to the pressure value in said pilot input, said valve means being adapted to be interconnected to said source and to said pilot input whereby said regulating means is adapted to operate said valve means to create said pressure value in said pilot input in relation to the sensed pressure value in said output means, said control means comprising an accumulator means interconnected to said pilot input intermediate said valve means and said relay means, and a restrictor means disposed intermediate said valve means and said accumulator means, the improvement wherein said regulating means also has means that is remote from said relay means and is adapted to sense the pressure value in said pilot input at a point intermediate said accumulator means and said relay means.

5. A control means as set forth in claim 4 wherein said valve means comprises a pair of valves one of which has an inlet means adapted to be interconnected to said source and an outlet means interconnected to said pilot input and the other of which has an inlet means interconnected to said outlet means of said one valve and an outlet means interconnected to vent.

6. A control means as set forth in claim 5 wherein each of said valves comprises an electrically operated valve.

* * * * *